(12) United States Patent
Hu et al.

(10) Patent No.: US 12,529,438 B2
(45) Date of Patent: Jan. 20, 2026

(54) CONNECTING JOINT

(71) Applicant: NINGBO SCHLEMMER AUTOMOTIVE PARTS CO., LTD., Ningbo (CN)

(72) Inventors: Bin Hu, Ningbo (CN); Zhanbang Wang, Ningbo (CN); Xiaobin Chen, Ningbo (CN); Wenbing Yu, Ningbo (CN); Jinhai Xia, Ningbo (CN)

(73) Assignee: NINGBO SCHLEMMER AUTOMOTIVE PARTS CO., LTD., Ningbo (CN)

( * ) Notice: Subject to any disclaimer, the term of this patent is extended or adjusted under 35 U.S.C. 154(b) by 0 days.

(21) Appl. No.: 19/023,483

(22) Filed: Jan. 16, 2025

(65) Prior Publication Data

US 2025/0155063 A1     May 15, 2025

Related U.S. Application Data

(63) Continuation of application No. PCT/CN2023/110956, filed on Aug. 3, 2023.

(30) Foreign Application Priority Data

Aug. 9, 2022 (CN) .......................... 202210950357.0
Nov. 18, 2022 (CN) .......................... 202211442463.4

(51) Int. Cl.
*F16L 37/088* (2006.01)
(52) U.S. Cl.
CPC ................................ *F16L 37/088* (2013.01)

(58) Field of Classification Search
CPC . F16L 37/0841; F16L 37/088; F16L 37/0885; F16L 37/098; F16L 37/0985;
(Continued)

(56) References Cited

U.S. PATENT DOCUMENTS 9,915,388 B2 * 3/2018 Hatanaka ............... F16L 37/144
11,199,281 B2 * 12/2021 Gauthier ............. F16L 37/0985
(Continued)

FOREIGN PATENT DOCUMENTS

CN     107606358 A     1/2018
CN     209385877 U     9/2019
(Continued)

OTHER PUBLICATIONS

European search report of EP23851679.3.

*Primary Examiner* — Aaron M Dunwoody

(57) ABSTRACT

A connecting joint including a joint main body and a locking spring is provided. The joint main body is provided with a slot, a slot wall of the slot is provided with a stop platform, the stop platform is provided with a first end surface and a second end surface opposite to each other, the locking spring includes an elastic strip, a locking block and an abutting and pushing block, position interference is formed between the abutting and pushing block and the matching joint, the locking block can bypass the first end surface of the stop platform and move to the second end surface of the stop platform under being driven by the elastic strip, and the locking spring can be locked to the joint main body and the matching joint can be fixed by abutting cooperation between the locking block and the second end surface of the stop platform.

12 Claims, 11 Drawing Sheets

(58) Field of Classification Search
CPC ... F16L 37/12; F16L 37/1205; F16L 37/1225; F16L 37/133
See application file for complete search history.

(56) References Cited

U.S. PATENT DOCUMENTS

| | | | | |
|---|---|---|---|---|
| 12,129,947 | B2* | 10/2024 | Que | F16L 37/0885 |
| 2010/0019483 | A1* | 1/2010 | Bokuhn | F16L 37/0985 |
| | | | | 285/93 |
| 2010/0052315 | A1 | 3/2010 | Kerin et al. | |
| 2017/0146173 | A1* | 5/2017 | Chaupin | F16L 37/1225 |
| 2022/0074529 | A1* | 3/2022 | Que | F16L 37/0885 |
| 2023/0304617 | A1* | 9/2023 | Que | F16L 37/1225 |
| 2024/0068610 | A1* | 2/2024 | Hunt | F16L 37/088 |
| 2025/0155063 | A1* | 5/2025 | Hu | F16L 37/088 |

FOREIGN PATENT DOCUMENTS

| | | |
|---|---|---|
| CN | 111075763 A | 4/2020 |
| CN | 111536347 A | 8/2020 |
| CN | 115355379 A | 11/2021 |
| CN | 115493011 A | 12/2022 |
| CN | 218510391 U | 2/2023 |
| CN | 219062714 U | 5/2023 |
| EP | 1526320 A1 | 4/2005 |

* cited by examiner

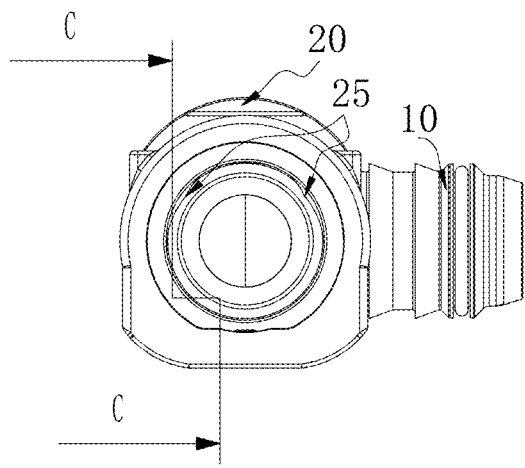
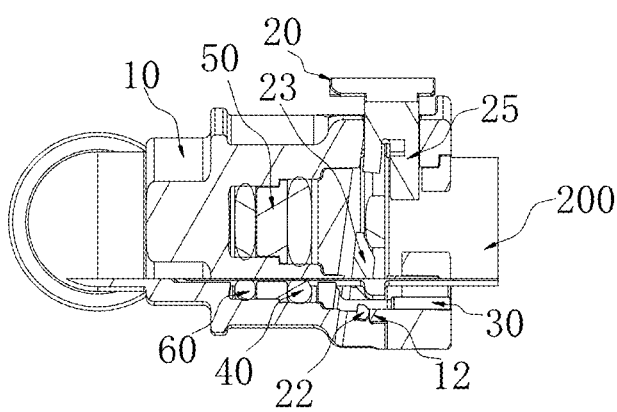
FIG. 14A
FIG. 14B
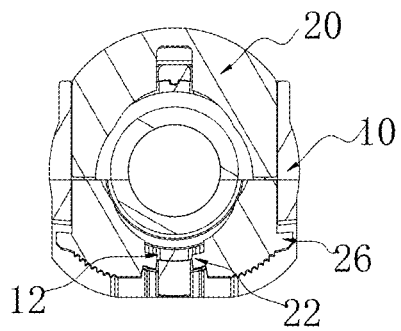
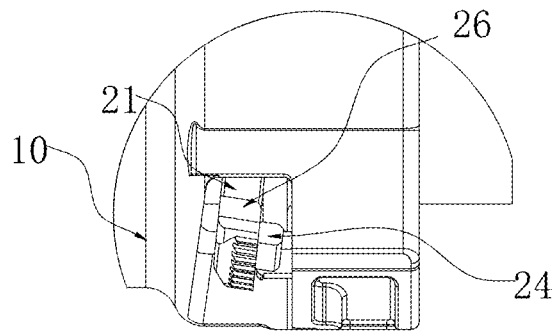
FIG. 14C
FIG. 14D

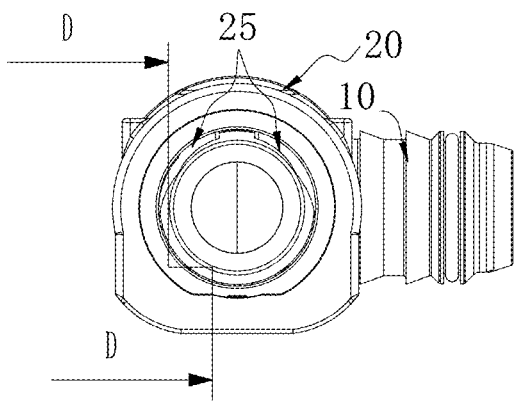
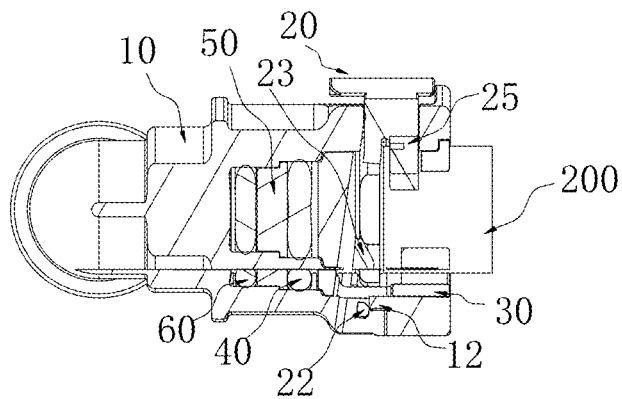
FIG. 15A　　　　　　　FIG. 15B
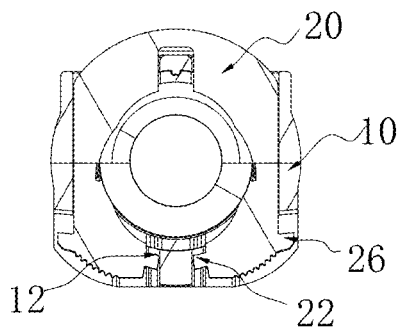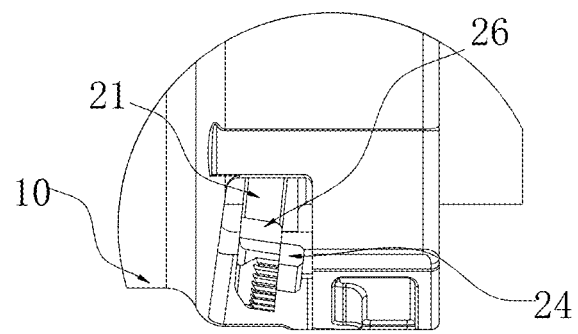
FIG. 15C　　　　　　　FIG. 15D

CONNECTING JOINT

CROSS-REFERENCE TO RELATED APPLICATIONS

This application is a continuation of international patent application No. PCT/CN2023/110956, filed on Aug. 3, 2023, which itself claims priority to Chinese patent application Nos. 202211442463.4, filed on Nov. 18, 2022, and titled "CONNECTING JOINT", and 202210950357.0, filed on Aug. 9, 2022, and titled "CONNECTING JOINT". The contents of the above identified applications are hereby incorporated herein in their entireties by reference.

TECHNICAL FIELD

The present disclosure relates to the field of refrigerant pipeline connection, and in particular, to a connecting joint.

BACKGROUND

A connector on a box is connected to and in communication with a connecting pipe via a connecting joint. Assembling between the connecting joint and the connector needs to meet a requirement of self-locking to prevent the connecting joint from detaching from the connector due to vibration and other factors.

At present, in related technology, the connecting joint is commonly provided with a locking spring to restrict the connector on the connecting joint by cooperation between the locking spring and the stop ring. However, in the related technology, the connecting joint has a complex structure and cannot be assembled in one time. Moreover, after the connecting joint is assembled with the connector, stability of the connector is not high when the connector is locked to the connecting joint, resulting in that the connecting joint is easily separated from the connector by users during operation.

SUMMARY

According to various embodiments of the present disclosure, a connecting joint is provided.

The present disclosure provides a connecting joint configured to connect a matching joint with a connecting pipe. The connecting joint includes a joint main body and a locking spring.

The joint main body is provided with a slot. A slot wall of the slot is provided with a stop platform. The stop platform is provided with a first end surface and a second end surface. The first end surface of the stop platform and the second end surface of the stop platform are disposed on two sides of the stop platform opposite to each other. The first end surface of the stop platform and an inner periphery side of the joint main body are disposed on a same surface of the joint main body.

The locking spring includes an elastic strip, a locking block and an abutting and pushing block. The locking block and the abutting and pushing block are disposed on the elastic strip. The locking spring is capable of being in contact with the inner periphery side of the joint main body and inserting into the slot until the locking block abuts against the first end surface of the stop platform. Position interference is formed between the abutting and pushing block and the matching joint. The abutting and pushing block is configured to push the elastic strip to elastically deform along an axis of the matching joint in response to being pushed by the matching joint. The locking block is capable of bypassing the first end surface of the stop platform and moving to the second end surface of the stop platform under being driven by the elastic strip. The locking spring is capable of being locked to the joint main body and the matching joint is capable of being fixed by abutting cooperation between the locking block and the second end surface of the stop platform.

In an embodiment, the abutting and pushing block is provided with an abutting and pushing bevel. The abutting and pushing bevel is configured to drive the elastic strip to elastically deform along the axis of the matching joint in response to being pushed by the matching joint, such that the locking block fit on the first end surface and moves towards the axis of the matching joint until the locking block detaches from the first end surface.

The elastic strip is capable of driving the locking block to move towards the axis of the locking spring by the pushing of the matching joint until the locking block moves to a position where the second end surface is located. The locking block is capable of being driven to move to the second end surface of the stop platform along a direction opposite to the axis of the matching joint by an elastic reset of the elastic strip.

In an embodiment, the stop platform is provided with a guiding bevel. The locking block is provided with a guiding matching surface fitting with the guiding bevel. The locking block is capable of being guided to move to the second end surface of the stop platform via cooperation between the guiding bevel and the guiding matching surface.

In an embodiment, the locking spring further includes a limiting plate. The limiting and stopping plate and the locking block are located on two sides of the elastic strip respectively. When the locking block abuts against the second end surface of the stop platform, the limiting and stopping plate is capable of abutting against the joint main body to restrict the locking spring on the joint main body.

In an embodiment, the elastic strip is provided with a protrusion. The protrusion includes an abutting surface. The abutting surface of the protrusion is in contact with the inner periphery side of the joint main body to guide the elastic deformation of the elastic strip along the axis of the matching joint.

In an embodiment, the locking spring further includes a guiding plate, and the locking spring is capable of acting on the matching joint via the guiding plate to restrict the matching joint to the joint main body.

The joint main body is provided with a sliding groove fitting with the guiding plate. The locking spring is capable of being inserted into the slot of the joint main body via cooperation between the guiding plate and the sliding groove.

In an embodiment, the elastic strip is provided with a boss. When the locking block abuts against the first end surface of the stop platform, the boss is capable of being snapped on the joint main body to restrict the locking spring from detaching from the joint main body.

In an embodiment, the joint main body is detachably provided with a fixing ring. The fixing ring is provided with a connecting rib. The locking spring is capable of driving the locking block to abut against the connecting rib by the elastic strip to restrict the locking spring from continuing to insert into the joint main body.

In an embodiment, the fixing ring is provided with an anti-mistake component. The joint main body is provided with an anti-mistake matching component fitting with the anti-mistake component. The fixing ring is capable of being guided and mounted in the joint main body via cooperation between the anti-mistake component and the anti-mistake matching component.

In an embodiment, an outer periphery wall of the fixing ring is provided with a protruding buckle. The joint main body is provided with a recess fitting with the protruding buckle, and the fixing ring is capable of being snapped on the joint main body via cooperation between the protruding buckle and the recess.

In an embodiment, the elastic strip is provided with a plurality of protrusion spikes. The plurality of protrusion spikes are sequentially arranged at intervals on a surface of a side of the elastic strip along an direction of the locking spring inserting into the joint main body.

In an embodiment, the connecting joint further includes a first sealing ring, a spacer ring and a second sealing ring. The first sealing ring, the spacer ring and the second sealing ring are sequentially embedded into the joint main body. The matching joint is capable of fitting with the joint main body and compressing the first sealing ring and the second sealing ring to deform.

Details of one or more embodiments of this disclosure are presented in the attached drawings and descriptions below. And other features, purposes and advantages of this disclosure will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

FIGS. 14A to 14D are cross-sectional schematic views of a third phase of a matching joint inserting into a joint main body along an axis of the matching joint in some embodiments.

FIGS. 15A to 15D are cross-sectional schematic views of a third phase of a matching joint inserting into a joint main body along an axis of the matching joint in some embodiments.

Figure 1:
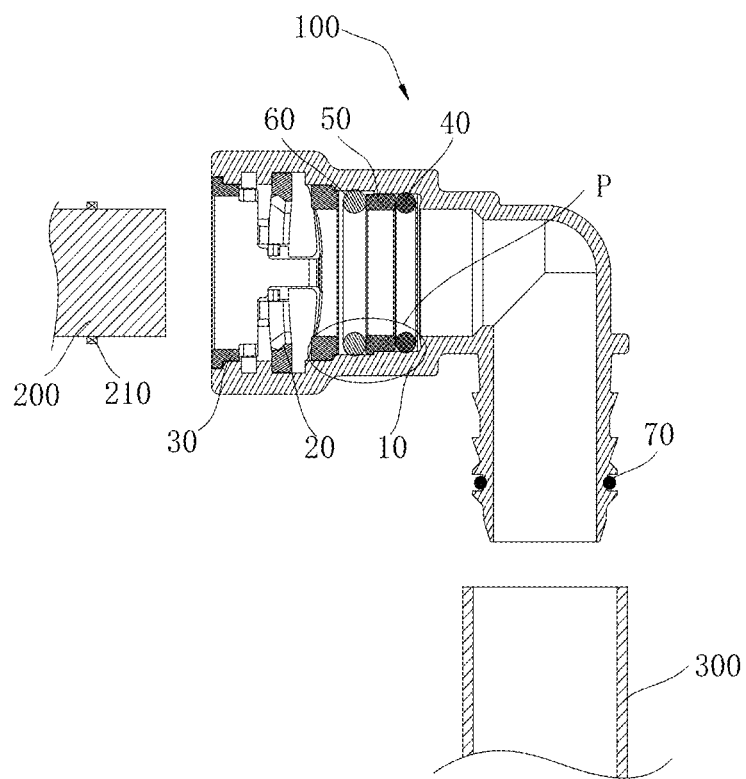
FIG. 1 is an exploded view of a connecting joint, a matching joint and a connecting pipe in some embodiments.

Reference signs are as follows: 100 represents a connecting joint; 10 represents a joint main body; 101 represents an inner periphery side; 102 represents a boss abutting surface; 11 represents a slot; 111 represents a slot wall; 12 represents a stop platform; 121 represents a first end surface; 122 represents a second end surface; 123 represents a guiding bevel; 13 represents a sliding groove; 14 represents an anti-mistake matching component; 141 represents a protruding rib; 15 represents a recess; 16 represents a step surface; 17 represents a first limiting boss; 18 represents a second limiting boss; 20 represents a locking spring; 21 represents an elastic strip; 211 represents a protrusion spike; 22 represents a locking block; 221 represents a guiding matching surface; 23 represents an abutting and pushing block; 231 represents an abutting and pushing bevel; 24 represents a protrusion; 241 represents an abutting surface; 25 represents a guiding plate; 26 represents a boss; 27 represents a limiting and stopping plate; 271 represents a tilting portion; 30 represents a fixing ring; 301 represents an outer periphery wall; 31 represents a connecting rib; 32 represents an anti-mistake component; 321 represents a strip groove; 33 represents a protruding buckle; 40 represents a first sealing ring; 50 represents a spacer ring; 51 represents a limiting step; 60 represents a second sealing ring; 70 represents a third sealing ring; 200 represents a matching joint; 210 represents a protruding ring; and 300 represents a connecting pipe.

DETAILED DESCRIPTION

The following will provide a clear and complete description of the technical solution in the embodiments of the present disclosure, in communication with the accompanying drawings. Obviously, the described embodiments are only a part of the embodiments of the present disclosure, not all of them. Based on the embodiments in the present disclosure, all other embodiments obtained by ordinary skill in this art without creative labor fall within the scope of protection of the present disclosure.

It should be noted that, when a member is considered "connected to" another member, it can be directly fixed to another member or there may be a centered member present simultaneously. When a member is considered "set on" another member, it can be directly set on another member or there may be a centered member present simultaneously. When a member is considered "fixed to" another member, it can be directly fixed to another member or there may be a centered member present simultaneously.

Unless otherwise defined, all technical and scientific terms used in this article have the same meanings as those commonly understood by those skilled in the art of the present disclosure. The terms used in the specification of the present disclosure are only for the purpose of describing specific embodiments and are not intended to limit the present disclosure. The term "and/of" used in this article includes any and all combinations of one or more related listed items.

Referring to FIG. 1, a connecting joint 100 in the present disclosure is configured to connect a matching joint 200 with a connecting pipe 300. The matching joint 200 and the connecting joint 100 can be configured as male and female joints matching with each other as required. The matching joint 200 is specifically mounted on a box containing liquid (not shown). The connecting pipe 300 is specifically set as a soft pipe.

Figure 3:
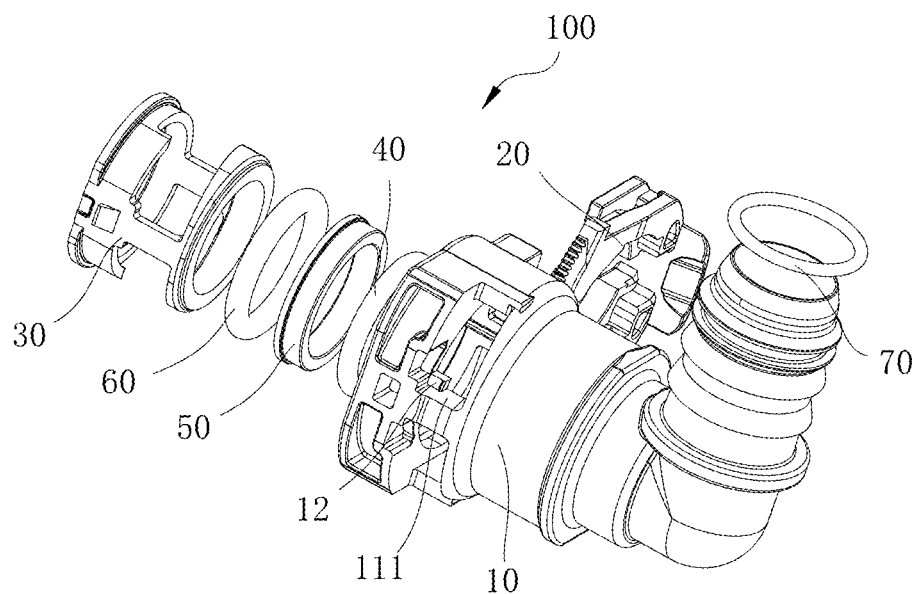
FIGS. 3 and 4 are an exploded view of a connecting joint in different views in some embodiments.
Figure 4:
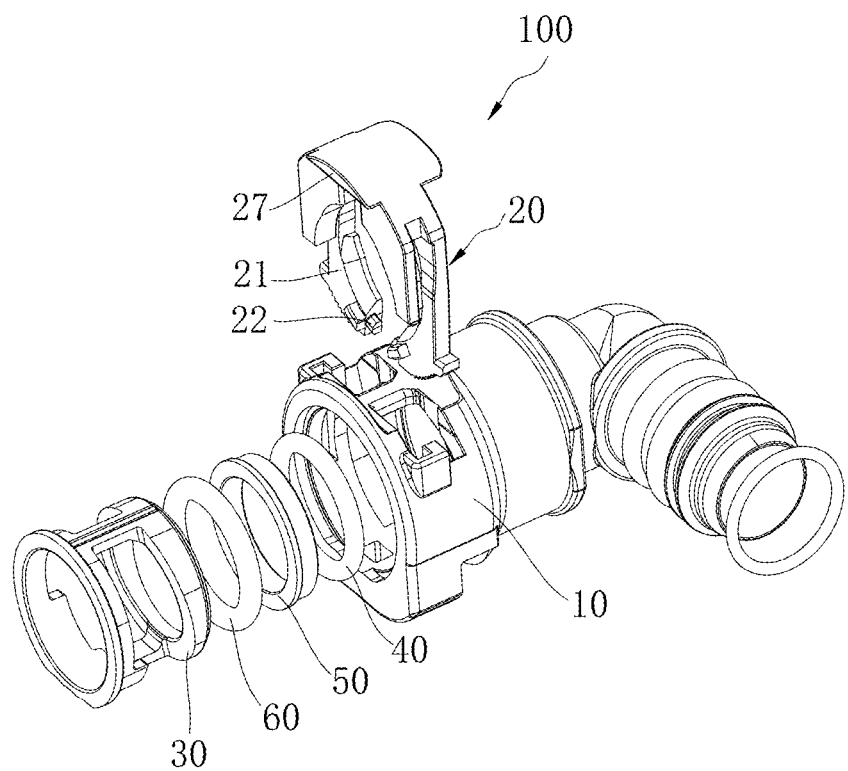
Figure 5:
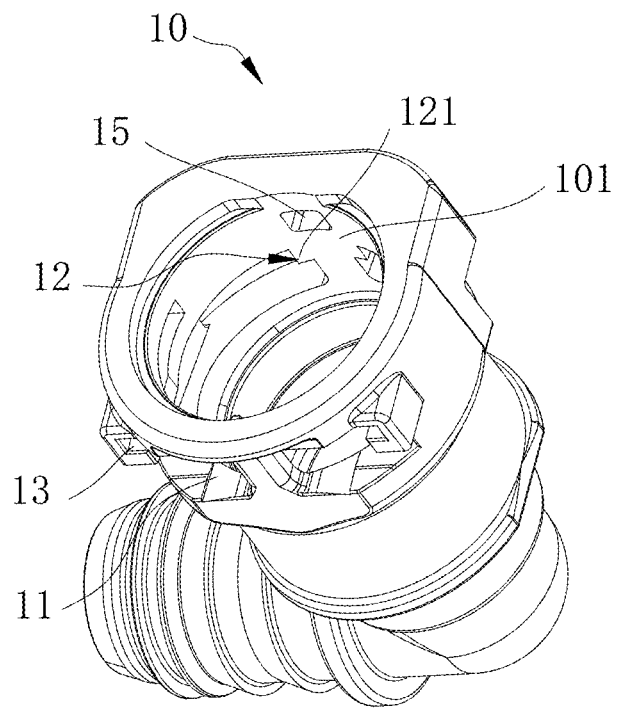
FIGS. 5, 6 and 7 are schematic diagrams of a joint main body in different views in some embodiments.
Figure 6:
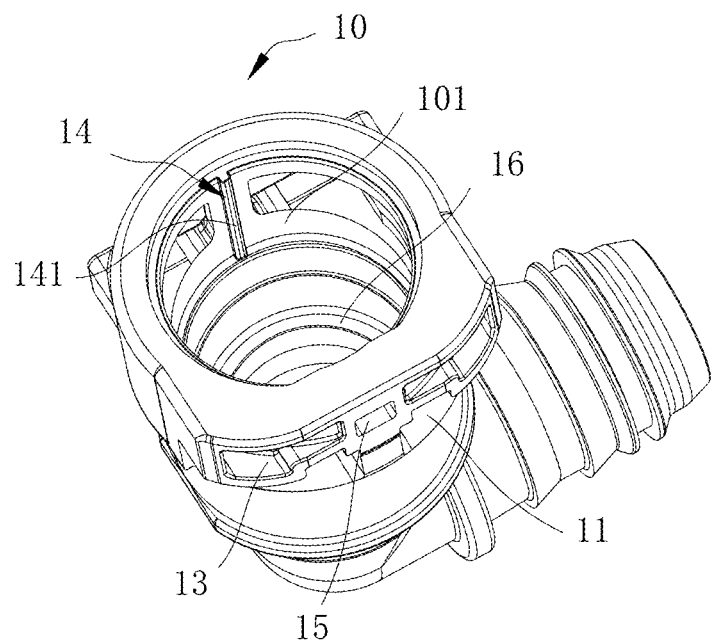
Figure 7:
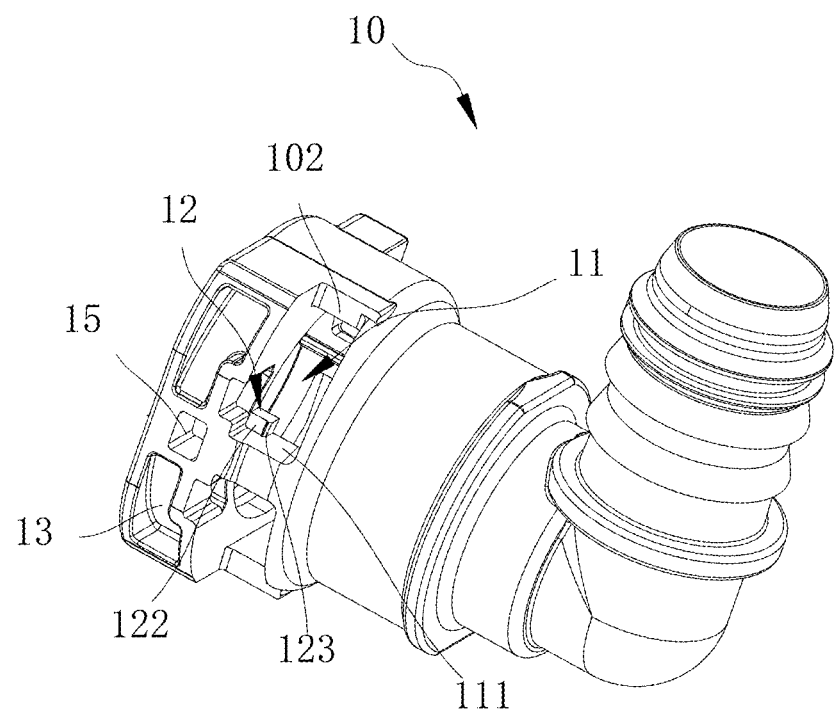
Figure 8:
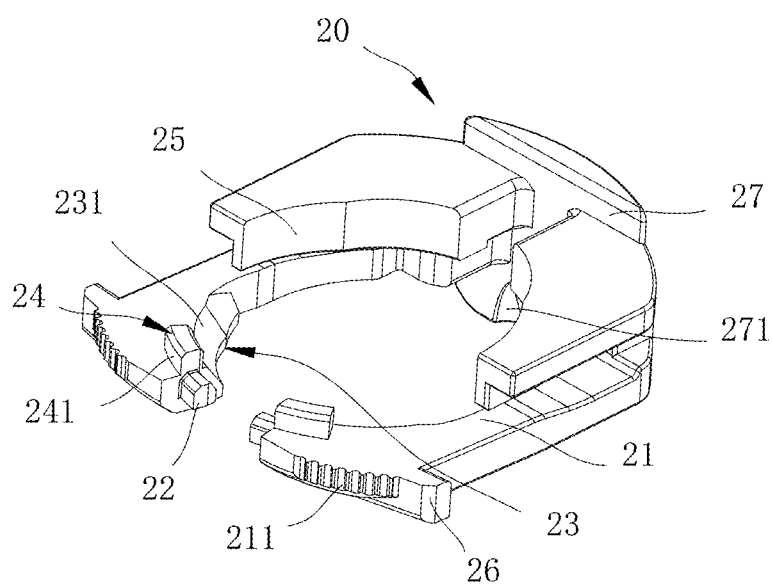
FIGS. 8 and 9 are schematic diagrams of a locking spring in different views in some embodiments.
Figure 9:
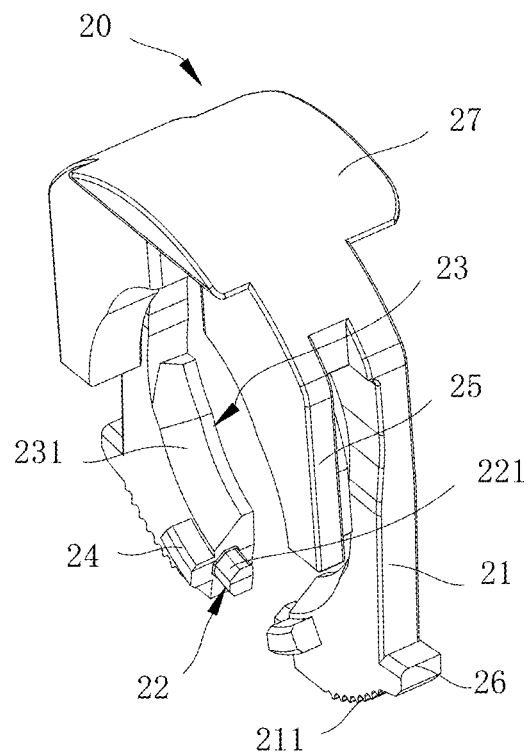

Referring to FIGS. 3 and 4, an embodiment of the present disclosure provides a connecting joint 100. The connecting joint 100 includes a joint main body 10, a locking spring 20, a fixing ring 30, a first sealing ring 40, a spacer ring 50 and a second sealing ring 60.

Referring to FIGS. 5 to 9, the joint main body 10 is provided with a slot 11. The locking spring 20 can be inserted into the joint main body 10 via the slot 11 to restrict the matching joint 200 to the joint main body 10. The connecting joint 100 is locked by inserting the locking spring 20 into the joint main body 10. A direction of the locking spring 20 inserting into the slot 11 of the joint main body 10 is parallel to a direction of the matching joint 200 inserting into the connecting joint 100 when the matching joint 200 is assembled with the connecting joint 100.

In the present disclosure, the joint main body 10 is provided with a stop platform 12 on a slot wall 111 of the slot 11. The stop platform 12 includes a first end surface 121 and a second end surface 122. The first end surface 121 of the stop platform 12 and the second end surface 122 of the stop platform 12 are disposed on two sides of the stop platform 12, respectively. The first end surface 121 of the stop boss 12 and an inner periphery side 101 of the joint main body 10 are located on the same surface. The locking spring 20 includes an elastic strip 21. The elastic strip 21 is provided with a locking block 22 and an abutting and pushing block 23. The locking spring 20 can drive the locking block 22 to be in contact with the inner periphery side 101 of the joint main body 10 inserting into the slot 11 until the locking block 22 abuts against the first end surface 121 of the stop platform 12. The abutting and pushing block 23 is provided with an abutting and pushing bevel 231. The matching joint 200 can push the abutting and pushing block 23 via the abutting and pushing bevel 231. The abutting and pushing block 23 can utilize elastic deformation of the elastic strip 21 to drive the locking block 22 to move to a position where the second end surface 122 of the stop platform 12 is located, so as to restrict the locking spring 20 to the joint main body 10. By an arrangement of the abutting and pushing block 23 on the abutting and pushing bevel 231, the abutting and pushing bevel 231 is pushed by inserting the matching joint 200 into the joint main body 10 to drive the elastic strip 21 to elastically deform, such that the elastic strip 21 elastically deform while driving the locking block 22 to move from the first end surface 121 of the stop platform 12 to the second end surface 122 of the stop platform 12. In the present disclosure, when the connecting joint 100 is inserted into and fits with the matching joint 200, the matching joint 200 inserted into the connecting joint 100 can act on the abutting and pushing bevel 231 of the abutting and pushing block 23 in the locking spring 20. The locking block 22 is driven to move from the first end surface 121 of the stop platform 12 to the second end surface 122 of the stop platform 12 by elastic deformation of the elastic strip 21, thereby abutting against and fitting with the second end surface 122 of the stop platform 12. Therefore, the locking spring 20 is restricted to the joint main body 10 to limit the matching joint 200 inserted into the connecting joint 100.

In the present disclosure, by above reasonable arrangement, when the connecting joint 100 is inserted into and fits with the matching joint 200, the matching joint 200 can act on the abutting and pushing block 23 of the elastic strip 21, and the elastic strip 21 is driven to elastically deform along an axis of the matching joint 200 by elastic deformation of the elastic strip 21, such that the locking block 22 can bypass the first end surface 121 of the stop platform 12 to move to the second end surface 122 of the stop platform 12 under being driven by the elastic strip 21. In this way, the locking spring 20 can be restricted on the joint main body 10 and the matching joint 200 can be fixed, such that the matching joint 200 can be assembled on the connecting joint 100 in one time, and during above process, no additional external tool is required, or the connecting joint 100 and the matching joint 200 are not required to be manually assembled again, facilitating assembling the connecting joint 100 with the matching joint 200, and improving stability of the overall structure between the connecting joint 100 and the matching joint 200 after the connecting joint 100 and the matching joint 200 being assembled with each other. The locking spring 20 can be continuously inserted into the joint main body 100 under being driven by the matching joint 200, thereby restricting a mounting position of the locking spring 20 on the matching joint 200. The phenomenon that the locking spring 20 is compressed again to be locked is avoided. In this way, assembling efficiency can be improved when the connecting joint 100 is assembled with the matching joint 200.

The number of the elastic strip 21 of the locking spring 20 is two, each of two elastic strips 21 is provided with the locking block 22 and the abutting and pushing block 23. Furthermore, the stop platform of the joint main body 10 corresponds to the locking block 22 one by one, thereby satisfying a requirement of mounting the locking spring 20 on the joint main body 10.

An outer wall of the matching joint 200 is provided with a protruding ring 210. The matching joint 200 can utilize the protruding ring 210 to push the abutting and pushing bevel 231 of the abutting and pushing block 23. By utilizing a bevel-structure characteristic of the abutting and pushing bevel 231, when the protruding ring 210 of the matching joint 200 starts to push the abutting and pushing bevel 231 of the abutting and pushing block 23, since the locking block 22 of the elastic strip 21 is in contact with an inner periphery side 101 of the joint main body 10, such that the abutting and pushing block 23 can only drive the elastic strip 21 to deform towards the axis of the matching joint 200, i.e., the locking block 22 is driven to be in contact with the first surface 121 of the stop platform 12 to move. When the locking block 22 detaches from the first surface 121, the locking block 22 suffers from an elastic reset force generated from the elastic strip 21 after elastically deforming, so as to restrict the elastic strip 21 from continuously deform along an axis of the matching joint 200. In this way, when the protruding ring 210 of the matching joint 200 continues to push the abutting and pushing block 23 of the abutting and pushing bevel 231, the elastic strip 21 extends outwards from the inner periphery side 101 of the joint main body 10, i.e., the locking block 22 is driven to move to a position where the second surface 122 of the stop platform 12 is located, and the abutting and pushing bevel 231 of the abutting and pushing block 23 detaches from the protruding ring 210 of the matching joint 200. Since the elastic strip 21 elastically resets, the locking block is driven to move on the second surface 122 of the stop platform 12 along a direction opposite to the matching joint 200 inserting along an axis of the matching joint 200, and realize an abutting cooperation between the locking block 22 and the stop platform 12, i.e., the locking spring 20 is restricted by the joint main body 10 via the cooperation between the stop platform 12 and the locking block 22. In addition, during a process of the locking spring 20 inserting into the inserting groove 11 of the joint main body 10, two elastic strips 21 of the locking spring 20 are compressed and closed, such that the locking block 22 of the locking spring 20 is always in contact with the inner periphery side 101 of the joint main body 10 during a process of the locking spring 20 inserting into the joint main body 10.

In the present disclosure, the stop platform 12 is provided with a guiding bevel 123. The locking block 22 is provided with a guiding matching surface 221 of the locking block 22 configured to fit with the guiding bevel 123. The locking block 22 is guided to move to the second surface 122 of the stop platform 12 by cooperation between the guiding bevel 123 and the guiding matching surface 221. In this way, during a process of the elastic deformation of the elastic strip 21, the guiding bevel 123 can play a guiding role in a moving direction of the locking block 22, such that the locking block 22 can move to a position where the second surface 122 of the stop platform 12 is located, resulting in realizing restriction between the locking block 22 and the stop platform 12.

In the present disclosure, the elastic strip 21 is provided with a protrusion 24. The protrusion 24 includes an abutting surface 241. The abutting surface 241 of the protrusion is in contact with the inner periphery side 101 of the joint main body 10, so as to guide the abutting and pushing block 23 to drive the elastic strip 21 to elastically deform along an axis of the matching joint 200. In the present disclosure, during the process of the locking spring 20 inserting into the joint main body 10, the locking block 22 and the protrusion 24 of the elastic strip 21 are simultaneously in contact with the inner periphery side 101 of the joint main body 10, thereby realizing a guiding effect, such that the elastic strip 21 can drive the locking block 22 to detach from the first surface 121 of the stop platform 12 and move to the position where the second surface 122 of the stop platform 12 is located.

A side surface of the elastic strip 21 is provided with a protrusion 24 towards the axis of the matching joint 200, such that the elastic strip 21 can only elastically deform along the axis of the matching joint 200.

During a process of the matching joint 200 inserting into the joint main body 10 that is locked by the locking spring 20, the abutting surface 241 of the protrusion 24 is always in contact with the inner periphery side 101 of the joint main body 10. In this way, it is guided by fitting between the abutting surface 241 of the protrusion 24 and the inner periphery side 101 of the joint main body 10, the elastic strip 21 can be guided to elastically deform along the axis of the matching joint 200, such that the locking block 22 detaches from the first surface 121 of the stop platform 12. Furthermore, the elastic strip 21 can be guided to elastically deform along the direction opposite to the axis of the matching joint 200, such that the locking block 22 moves to the second surface 122 of the stop platform 12.

In the present disclosure, the locking spring 20 further includes a guiding plate 25. The locking spring 20 can act on the matching joint 200 via the guiding plate 25, so as to restrict the matching joint 200 on the joint main body 10. Therefore, the locking spring 20 can restrict the matching joint 200 inserted into the joint main body 10.

The joint main body 10 is provided with a sliding groove 13 fitting with guiding plate 25. By cooperation between the guiding plate 25 and the sliding groove 13, the locking spring 20 is guided to be inserted into the slot 11 of the joint main body 10, such that the locking spring 20 is pre-installed on the joint main body 10, and a requirement of inserting the locking spring 20 into the joint main body 10 is satisfied.

By such arrangement of the guiding plate 25, the locking spring 20 locks with the matching joint 200 inserting into the joint main body 10. By cooperation between the guiding plate 25 and the sliding groove 13, the locking spring 20 is guided to be inserted into the joint main body 10, thereby satisfying a requirement of inserting and mounting the locking spring 20 into the joint main body 10.

The elastic strip 21 is further provided with a boss 26. When the locking block 22 abuts against the first end surface 121, the boss 26 can be snapped on the joint main body 10 to restrict the locking spring 20 from detaching from the joint main body 10. Therefore, when the locking spring 20 is pre-mounted on the joint main body 10 by snapping between the boss 26 and the joint main body 10, it can play a restricting role in preventing the locking spring 20 pre-installed on the joint main body 10 from detaching, i.e., the phenomenon that the locking spring 20 detaches from the joint main body 10 is avoided, such that the connecting joint 100 can be supplied externally as a whole, facilitating subsequent packaging and transportation and reducing costs.

The joint main body 10 is provided with a boss abutting surface 102. The boss abutting surface 102 is disposed on an outer side of the inner periphery side 101 of the joint main body 10 to fit with the boss 26. In this way, when the locking spring 20 is inserted into the slot 11 of the joint main body 10, the boss 26 of the locking spring 20 is compressed by the inner periphery side 101 of the joint main body 10 to drive the elastic strip 21 to contract. When the boss 26 detaches from the inner periphery side 101 to move to a position where the boss abutting surface 102 is located, the elastic strip 21 can elastically reset and drive the boss 26 to move outwards and the boss 26 can be snapped with the boss abutting surface 102, resulting in restricting the locking spring 20 from detaching from the joint main body 10.

In the present disclosure, the elastic strip 21 is provided with a plurality of protrusion spikes 211. The plurality of protrusion spikes 211 are sequentially arranged at intervals on a side surface of the elastic strip 21 along the direction of the locking spring 20 inserting into the joint main body 10. In this way, since piercing effect on fingers may be caused by contact between the plurality of prototype spikes 211 and the fingers, it can avoid operation of workers by mistake, so as to ensure stability after the connecting joint 100 and the matching joint 200 being assembled with each other.

In addition, in the present disclosure, the locking spring 20 is further provided with a limiting plate 27. When the locking block 22 abuts against the second end surface 122 of the stop platform 12, the limiting plate 27 can abut against the joint main body 10 to restrict the locking spring 20 from continuously to insert into the joint main body 10 to realize the locking spring 20 being assembled on the joint main body 10. Furthermore, if it is required to release the connecting joint 100 from the matching joint 200 in the following operation, the locking spring 20 can be released from the joint main body 10 by a way that an unlock tool tilts the limiting plate 27.

In the present disclosure, the limiting plate 27 protrudes away from the joint main body 10 to form a tilting portion 271, such that the unlock tool can be inserted into a position where the tilting portion 271 is located and the limiting plate 27 is tilted, facilitating releasing the connecting joint 100 from the matching joint 200 after the connecting joint 100 and the matching joint 200 being fully assembled with each other. The above tool can be a structure with a flat head, and the flat head can be inserted into the tilting portion 271.

By above limiting plate 27, after the matching joint 200 being assembled in the joint main body 10, the overall locking spring 20 can be locked to the joint main body 10.

Referring to FIGS. 12 to 17, a process of the matching joint 200 inserting into the joint main body 10 along the axis of the the matching joint 200 can be described as first phase to fourth phase in follows.

Referring to FIGS. 12A to 12D, in the first phase, the locking spring 20 can drive the locking block 22 to be in contact with the inner periphery side 101 of the joint main body 10 and insert into the slot 11 until the locking block 22 abuts against the first end surface 121 of the stop platform 12. The matching joint 200 is inserted into the joint main body 10 of the connecting joint 100 and abuts against the abutting and pushing block 23 of the elastic strip 21 of the locking spring 20.

Referring to FIGS. 13A to 13D, in the second phase, the matching joint 200 pushes the abutting and pushing block 23 of the elastic strip 21 of the locking spring 20 by the protruding ring 210, thereby driving the elastic strip 21 to elastically deform along the axis of the matching joint 200. Since the locking block 22 of the elastic strip 21 is in contact with the inner periphery side 101 of the joint main body, the abutting and pushing block 23 can only drive the elastic strip 21 to deform along the axis of the matching joint 200. The first end surface 121 of the stop plat form 12 and the inner periphery side 101 of the joint main body 10 are on the same surface, i.e., the locking block 22 is driven to fit on the first end surface 121 of the stop platform 12 to move. The elastic strip 21 can only elastically deform along the axis of the matching joint 200. and be restricted from deforming along a radial direction of the matching joint 200.

Referring to FIG. 14A to FIG. 14D and FIG. 15A to FIG. 15D, in the third phase, when the locking block 22 moves from a state of fitting on the first end surface 121 of the stop platform 12 to a state of detaching from the first end surface 121 of the stop platform 12, the locking block 22 suffers from the elastic reset force generated by the elastic strip 21 after the elastic strip 21 elastically deforming, thereby restricting the elastic stripe 21 from continuously deforming along the axis of the matching joint 200. In addition, since a force exerted by the matching joint 200 on the abutting and pushing bevel 231 of the abutting and pushing block 23 can be decomposed into two force acting on the elastic strips 21. One of the two forces is along an inserting direction of the matching joint 200, and the other one of the two forces is along a direction of the locking spring 20 inserting into the joint main body 10. By the protruding ring 210 of the matching joint 200 continuously pushing the abutting and pushing block 23, the abutting and pushing block 23 experiences a radial expansion force via the abutting and pushing bevel 231. The elastic strip 21 expends from the inner periphery side 101 of the joint main body 10. The abutting and pushing bevel 231 detaches from and does not abut against the protruding ring 210 of the matching joint 200. The elastic strip 21 drives the locking block 22 to move to a position where the second end surface 122 of the stop platform 12 is located.

Referring to FIGS. 16A to 16D, in the fourth phase, due to the elastic reset of the elastic strip 21, the locking block 20 can be driven to move to the second end surface 122 of the stop platform 12 along a direction opposite to the axis of the second end surface 122 of the stop platform 12 towards the matching joint 200, resulting in realizing an abutting cooperation between the locking block 22 and the stop platform 12 and self-locking of the locking spring 20.

Figure 10:
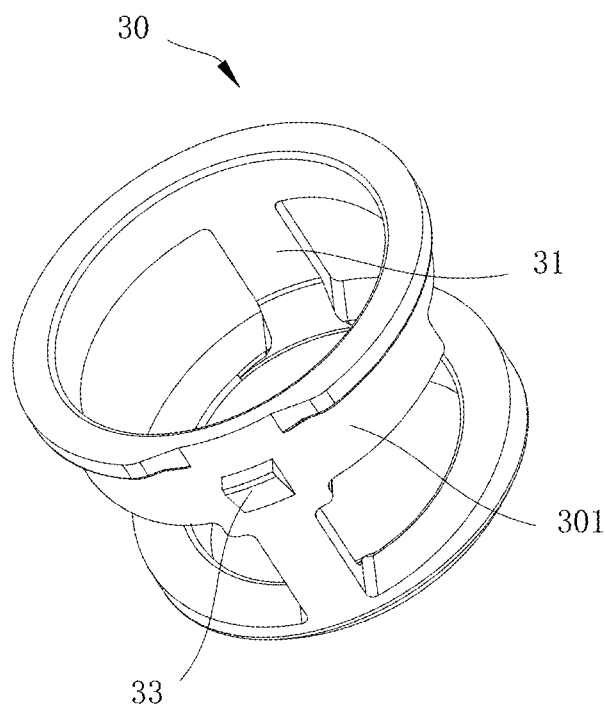
FIGS. 10 and 11 are schematic diagrams of a fixing ring in different views in some embodiments.
Figure 11:
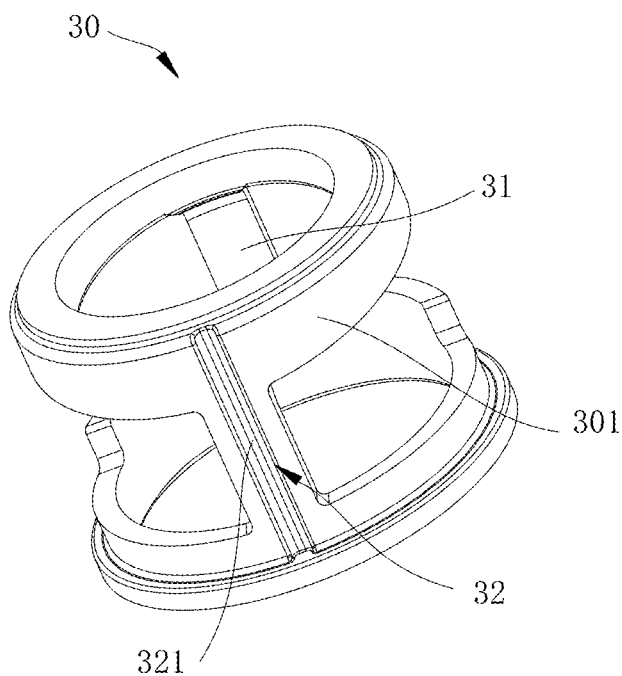
Figures 12A, 12B:
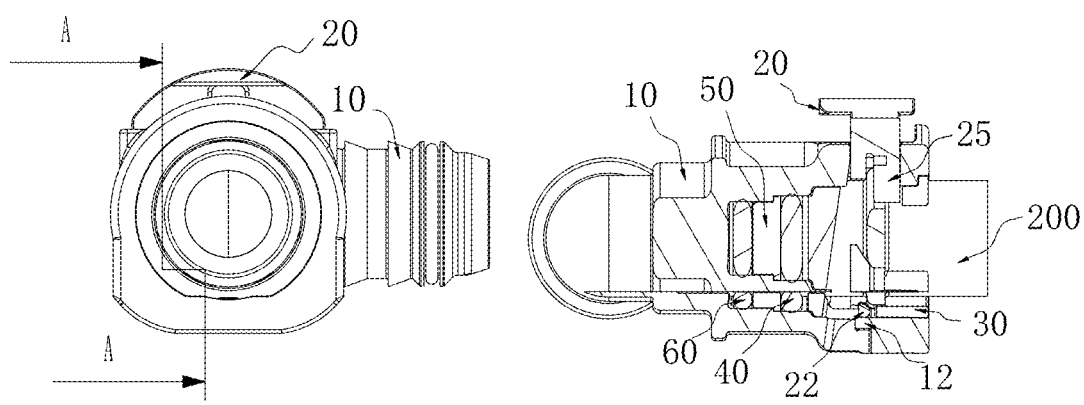
FIGS. 12A to 12D are cross-sectional schematic views of a first phase of a matching joint inserting into a joint main body along an axis of the matching joint in some embodiments.
Figure 12C:
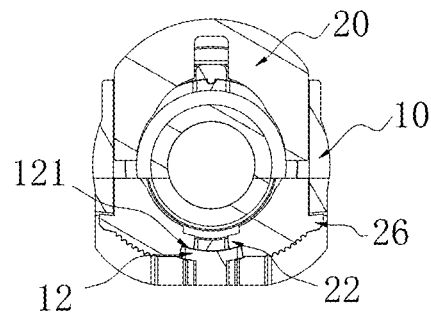
Figure 12D:
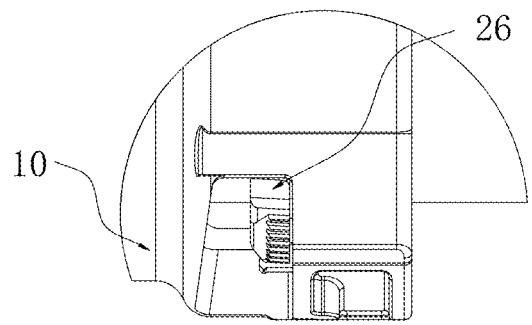
Figure 13A:
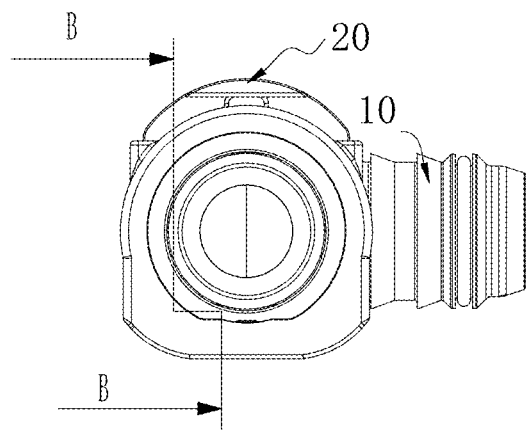
FIGS. 13A to 13D are cross-sectional schematic views of a second phase of a matching joint inserting into a joint main body along an axis of the matching joint in some embodiments.
Figure 13B:
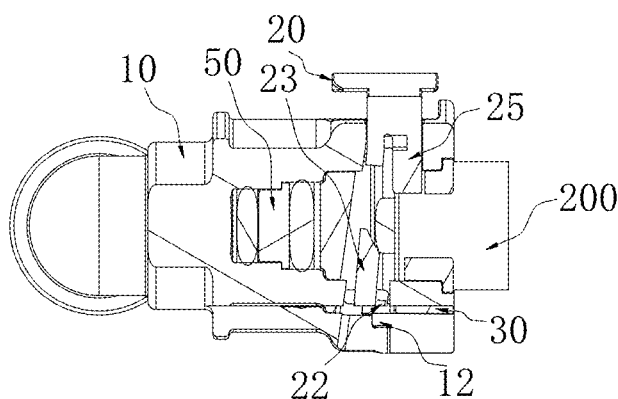
Figure 13C:
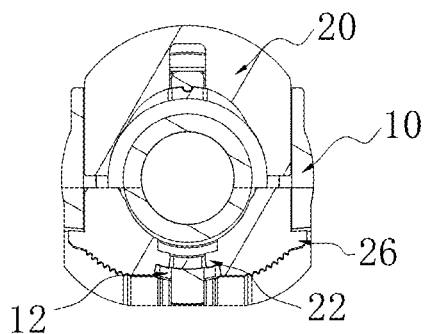
Figure 13D:
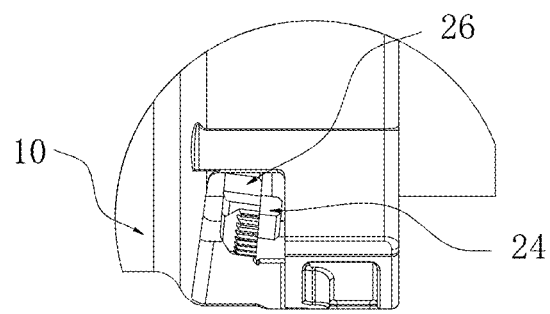
Figure 16A:
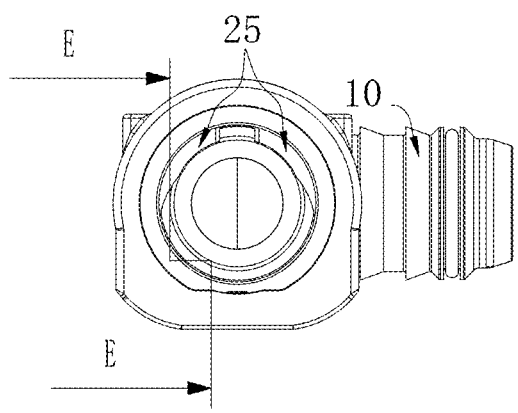
FIGS. 16A to 16D are cross-sectional schematic views of a fourth phase of a matching joint inserting into a joint main body along an axis of the matching joint in some embodiments.
Figure 16B:
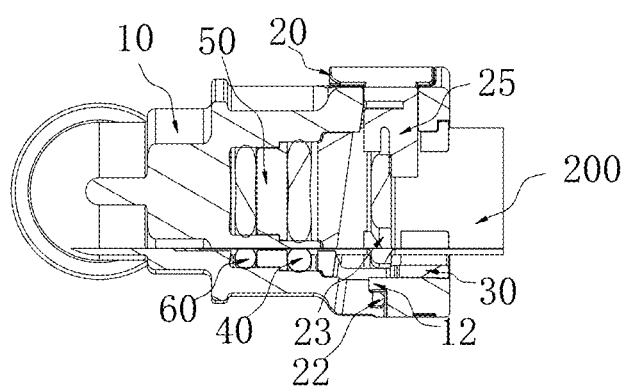
Figure 16C:
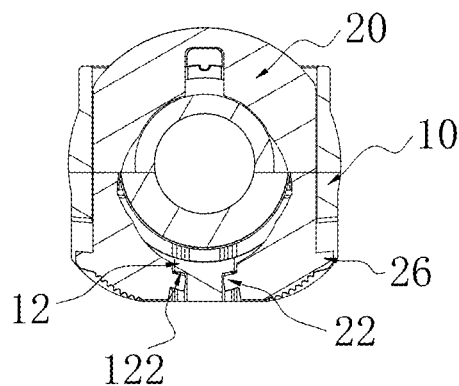
Figure 16D:
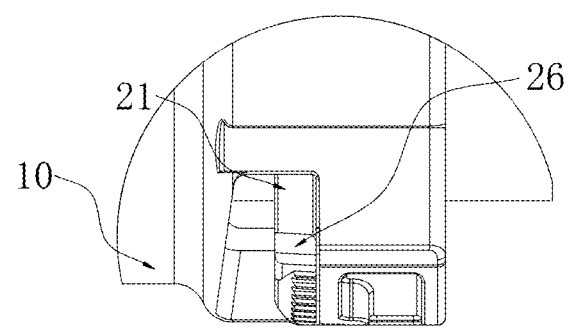
Figure 17:
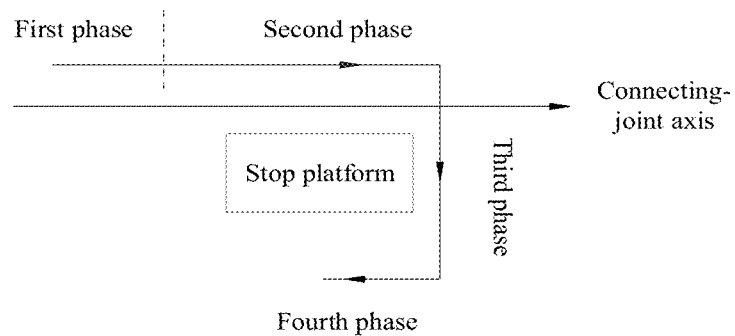
FIG. 17 is a positional-relationship view of a locking block relative to a stop platform when a matching joint is inserted into a joint main body along an axis of the matching joint during the first to fourth phases in some embodiments.

Referring to FIGS. 10 and 11, in the present disclosure, the fixing ring 30 is provided with a connecting rib 31. The locking spring 20 can abut against the connecting rib 31 under being driven by the locking block 22, resulting in restricting the locking spring 20 from continuously inserting into the joint main body 10. In this way, it can play a restricting role in preventing excessive insertion of the locking spring 20 pre-installed on the joint main body 10, i.e., an assembling position between the locking spring 20 and the joint main body 10 is determined, thereby satisfying a requirement of packaging and transporting the overall connecting joint 100. In the present disclosure, the fixing ring 30 is provided with an avoidance structure (not shown). The avoidance structure is configured to give away for the joint main body 10 inserting into the locking spring 20, resulting in satisfying requirement of the locking spring 20 inserting into the joint main body 10.

In the present disclosure, the fixing ring 30 is provided with an anti-mistake component 32. The joint main body 10 is provided with an anti-mistake matching component 14 fitting with the anti-mistake component 32. By cooperation between the anti-mistake component 32 and the anti-mistake matching component 14, the fixing ring 30 is guided to be mounted in the joint main body 10, so as to play an anti-mistake role in the fixing ring 30 being mounted on the joint main body 10, facilitating mounting the fixing ring 30 in the joint main body 10. The fixing ring 30 plays the anti-mistake role for assembling on the joint main body 10, i.e., the fixing ring 30 can be accurately positioned on the joint main body 10.

In the present disclosure, the anti-mistake component 32 is set as a strip groove 321 disposed on the outer periphery wall 301 of the fixing ring 30. The anti-mistake matching component 14 is provided as a protruding rib 141 disposed on the inner periphery side 101 of the joint main body 10, and the strip groove 321 fits with the protruding rib 141 in a concave-convex manner, in which the concave-convex manner includes that the strip groove 321 is a concave structure and the protruding rib 141 is a convex structure or the strip groove 321 is a convex structure and the protruding rib 141 is a concave structure, resulting in guiding assembling of the fixing ring 30 on the joint main body 10. Alternatively, the anti-mistake component 32 can be but not limited as the strip groove 321 shown in figures, and the anti-mistake matching component 14 can be but not limited as the protruding rib 141 shown in the drawings. For one skilled in art, the anti-mistake component 32 and the anti-mistake matching component 14 are defined as other structures corresponding each other, which will be not described herein.

In the present disclosure, the outer periphery wall 301 of the fixing ring 30 is provided with a protruding buckle 33. The joint main body 10 is provided with a recess 15 fitting with the protruding buckle 33. The fixing ring 30 can be snapped on the joint main body 10 by cooperation between the protruding buckle 33 and the recess 15, resulting in realizing assembly and connection between the fixing ring 30 and the joint main body 10, facilitating assembling of the fixing ring 30 on the joint main body 10.

In the present disclosure, the first sealing ring 40, the spacer ring 50 and the second sealing ring 60 are sequentially embedded into the joint main body 10. The matching joint 200 can fit with the joint main body 10 and compress the first sealing ring 40 and the second sealing ring 60 to deform, such that when the connecting joint 100 fits with the matching joint 200 in an inserting manner, the first sealing ring 40 and the second sealing ring 60 can play a dual sealing role, thereby satisfying a requirement of assembling and sealing the connecting joint 100 with the matching joint 200.

Figure 2:
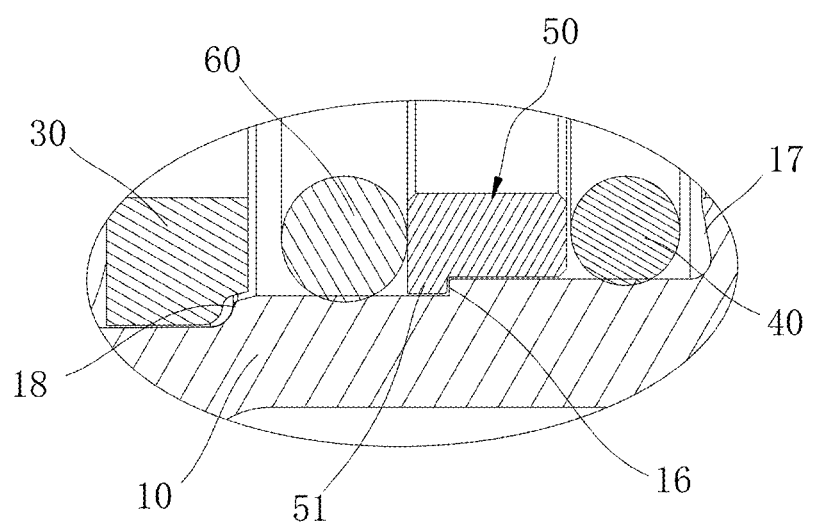
FIG. 2 is an enlarged view of P portion in FIG. 1.

Referring to FIG. 2, the spacer ring 50 is provided with a limiting step 51. The joint main body 10 is provided with a step surface 16 fitting with the limiting step 51. The spacer ring 50 can be mounted in the joint main body 10 until the limiting step 51 of the spacer ring 50 abuts against the step surface 16, i.e., an assembling position of the spacer ring 50 on the joint main body 10 is determined. In this way, a size for assembling the first sealing ring 40 and the second sealing ring 60 on the joint main body 10 is greater than sizes of first sealing ring 40 and the second sealing ring 60, so as to supply corresponding deformation space for the first sealing ring 40 and the second sealing ring 60. In the present disclosure, a first limiting boss 17 and the second limiting boss 18 are formed by the inner periphery side 101 of the joint main body 10. The first limiting boss 17 can abut against the first sealing ring 40 to restrict the first sealing ring 40 to a position between the first limiting boss 17 and the spacer ring 50. The second limiting boss 18 can abut against the fixing ring 30 to restrict the second sealing ring 60 to a position between the spacer ring 50 and the fixing ring 30, thereby satisfying a requirement of the first sealing ring 40 and the second sealing ring 60 being deformed when compressed.

Furthermore, in the present disclosure, a third sealing ring 70 is sleeved on an end of the joint main body 10 away from the fixing ring 30. The connecting joint 100 can be assembled and sealed with the connecting pipe 300 via the third sealing ring 70. Alternatively, the number of the third sealing ring 70 can be multiple, which is not limited herein.

In summary, in the present disclosure, the connecting joint connecting joint 100 can be assembled with the matching join 200 in one time via the above reasonable structure. During above process, no additional external tool is required, or the connecting joint 100 and the matching joint 200 are not required to be manually assembled again, facilitating assembling the connecting joint 100 with the matching joint 200, and improving the stability of the overall structure between the connecting joint 100 and the matching joint 200 after the connecting joint 100 and the matching joint 200 being assembled with each other.

The technical features of the above embodiments may be combined arbitrarily, so that the description is concise, and all possible combinations of the technical features in the above embodiments are not described; however, as long as the combination of these technical features does not conflict, it should be considered that the scope is recited in the present disclosure.

It should be appreciated by those of ordinary skill in the art that the above embodiments are only used to illustrate the present disclosure and are not intended to limit the present disclosure, as long as appropriate changes and modifications to the above embodiments fall within the scope of protection of the present disclosure within the spirit and scope of the present disclosure.

What is claimed is:

1. A connecting joint configured to connect a matching joint with a connecting pipe, comprising:
   a joint main body, wherein the joint main body is provided with a slot, a slot wall of the slot is provided with a stop platform, the stop platform is provided with a first end surface and a second end surface, the first end surface of the stop platform and the second end surface of the stop platform are disposed on two sides of the stop platform opposite to each other, and the first end surface of the stop platform and an inner periphery side of the joint main body are disposed on a same surface; and
   a locking spring, wherein the locking spring comprises an elastic strip, a locking block and an abutting and pushing block, the locking block and the abutting and pushing block are disposed on the elastic strip, the locking spring is capable of being in contact with the inner periphery side of the joint main body and inserting into the slot until the locking block abuts against the first end surface of the stop platform, wherein position interference is formed between the abutting and pushing block and the matching joint, the abutting and pushing block is configured to push the elastic strip to elastically deform along an axis of the matching joint in response to being pushed by the matching joint, the locking block is capable of bypassing the first end surface of the stop platform and moving to the second end surface of the stop platform under being driven by the elastic strip, and the locking spring is capable of being locked to the joint main body and the matching joint is capable of being fixed by abutting cooperation between the locking block and the second end surface of the stop platform.

2. The connecting joint of claim 1, wherein the abutting and pushing block is provided with an abutting and pushing bevel, the abutting and pushing bevel is configured to drive the elastic strip to elastically deform along the axis of the matching joint in response to being pushed by the matching joint, such that the locking block fits on the first end surface and moves towards the axis of the matching joint until the locking block detaches from the first end surface; and
   the elastic strip is capable of driving the locking block to move towards the axis of the locking spring by pushing of the matching joint until the locking block moves to a position where the second end surface is located, and the locking block is capable of being driven to move to the second end surface of the stop platform along a direction opposite to the axis of the matching joint by an elastic reset of the elastic strip.

3. The connecting joint of claim 2, wherein the stop platform is provided with a guiding bevel, the locking block is provided with a guiding matching surface fitting with the guiding bevel, and the locking block is capable of being guided to move to the second end surface of the stop platform via cooperation between the guiding bevel and the guiding matching surface.

4. The connecting joint of claim 1, wherein the locking spring further comprises a limiting and stopping plate, the limiting and stopping plate and the locking block are located on two sides of the elastic strip respectively; and
   when the locking block abuts against the second end surface of the stop platform, the limiting and stopping plate is capable of abutting against the joint main body to restrict the locking spring on the joint main body.

5. The connecting joint of claim 1, wherein the elastic strip is provided with a protrusion, the protrusion comprises an abutting surface, and the abutting surface of the protrusion is in contact with the inner periphery side of the joint main body to guide elastic deformation of the elastic strip along the axis of the matching joint.

6. The connecting joint of claim 1, wherein the locking spring further comprises a guiding plate, and the locking spring is capable of acting on the matching joint via the guiding plate to restrict the matching joint to the joint main body; and the joint main body is provided with a sliding groove fitting with the guiding plate, and the locking spring is capable of being inserted into the slot of the joint main body via cooperation between the guiding plate and the sliding groove.

7. The connecting joint of claim 1, wherein the elastic strip is provided with a boss, when the locking block abuts against the first end surface of the stop platform, and the boss is capable of being snapped on the joint main body to restrict the locking spring from detaching from the joint main body.

8. The connecting joint of claim 1, wherein the joint main body is detachably provided with a fixing ring; the fixing ring is provided with a connecting rib, and the locking spring is capable of driving the locking block to abut against the connecting rib by the elastic strip to restrict the locking spring from continuing to insert into the joint main body.

9. The connecting joint of claim 8, wherein the fixing ring is provided with an anti-mistake component, the joint main body is provided with an anti-mistake matching component fitting with the anti-mistake component, and the fixing ring is capable of being guided and mounted in the joint main body via cooperation between the anti-mistake component and the anti-mistake matching component.

10. The connecting joint of claim 8, wherein an outer periphery wall of the fixing ring is provided with a protruding buckle, the joint main body is provided with a recess fitting with the protruding buckle, and the fixing ring is capable of being snapped on the joint main body via cooperation between the protruding buckle and the recess.

11. The connecting joint of claim 1, wherein the elastic strip is provided with a plurality of protrusion spikes, and the plurality of protrusion spikes are sequentially arranged at intervals on a surface of a side of the elastic strip along an direction of the locking spring inserting into the joint main body.

12. The connecting joint of claim 1, further comprising a first sealing ring, a spacer ring and a second sealing ring, wherein the first sealing ring, the spacer ring and the second sealing ring are sequentially embedded into the joint main body, and the matching joint is capable of fitting with the joint main body and compressing the first sealing ring and the second sealing ring to deform.

\* \* \* \* \*